Figure 6:
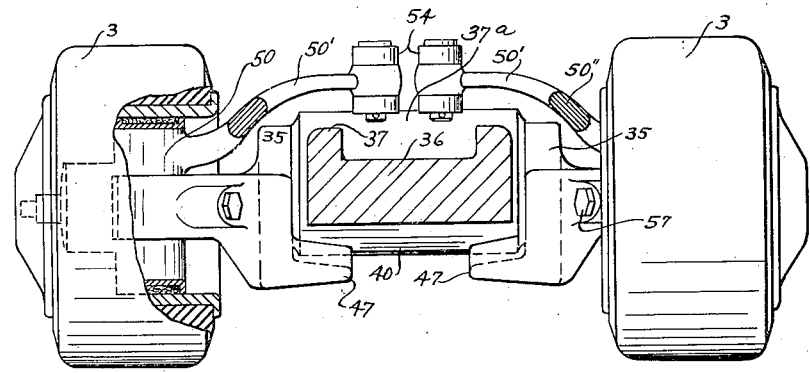

June 7, 1932.　　　M. S. TOWSON　　　1,862,287
INDUSTRIAL TRUCK
Filed May 31, 1929　　　5 Sheets-Sheet 1
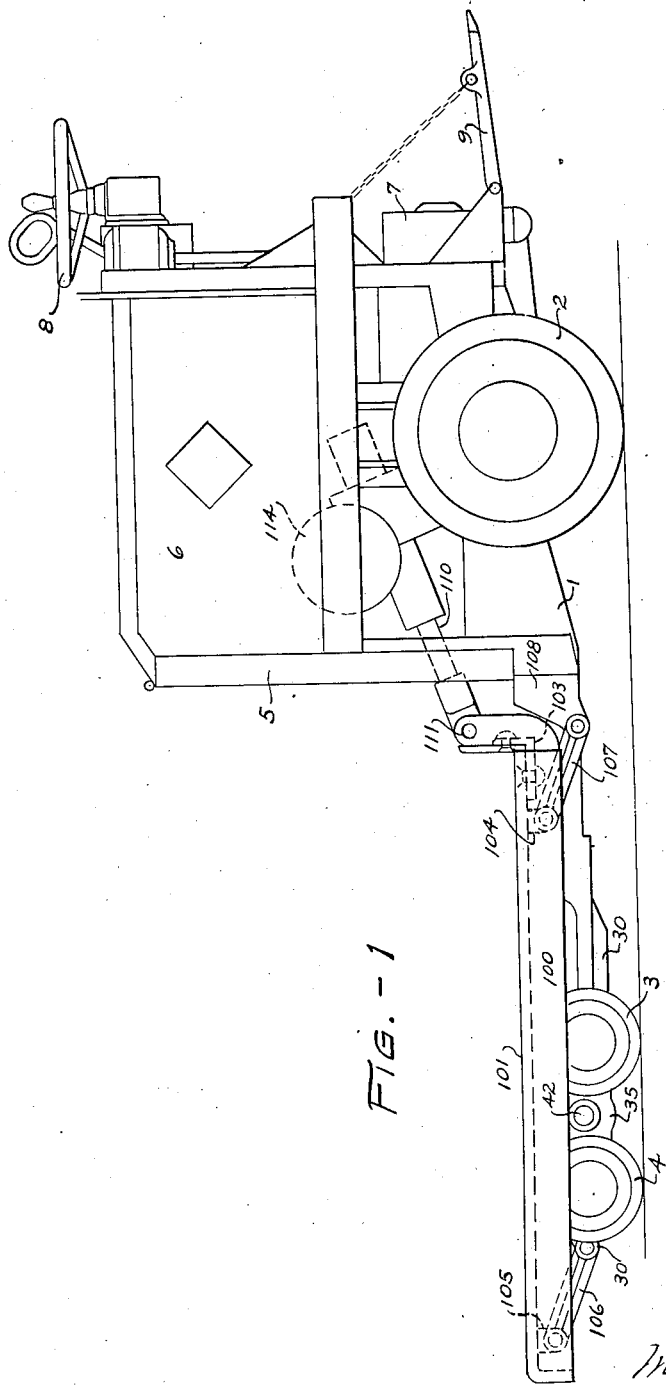
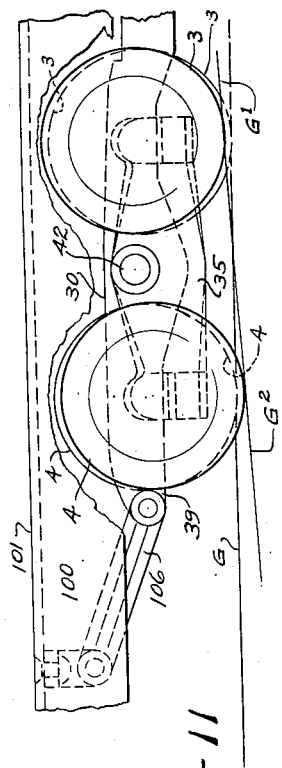
Inventor
Morris S. Towson
By Bates, Golrick & Teare
Attorney

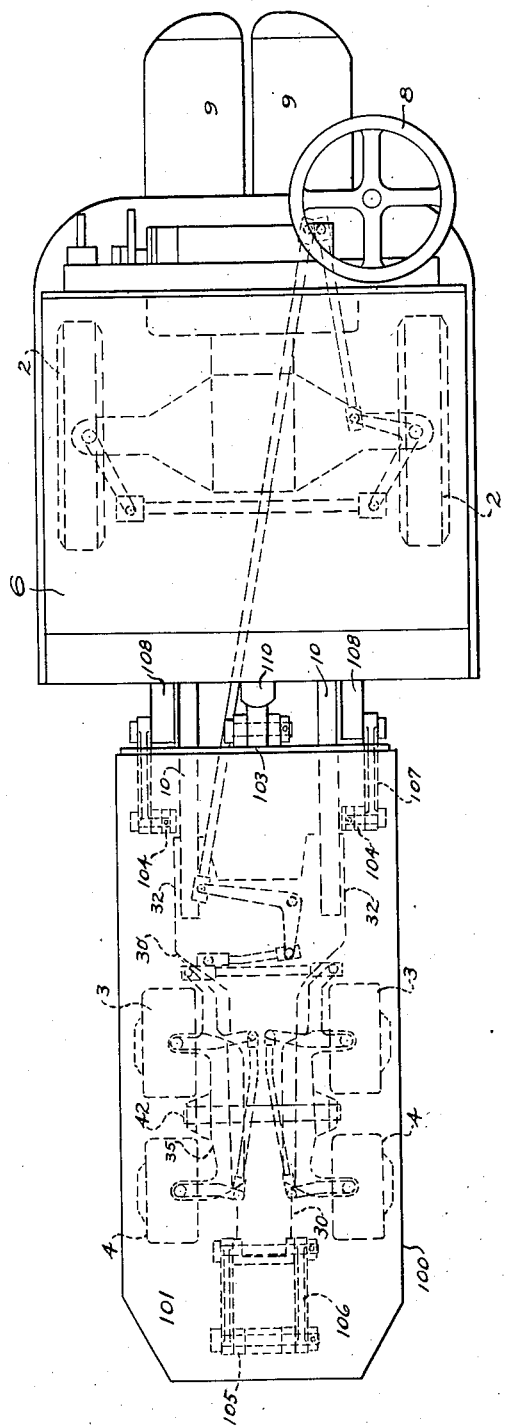

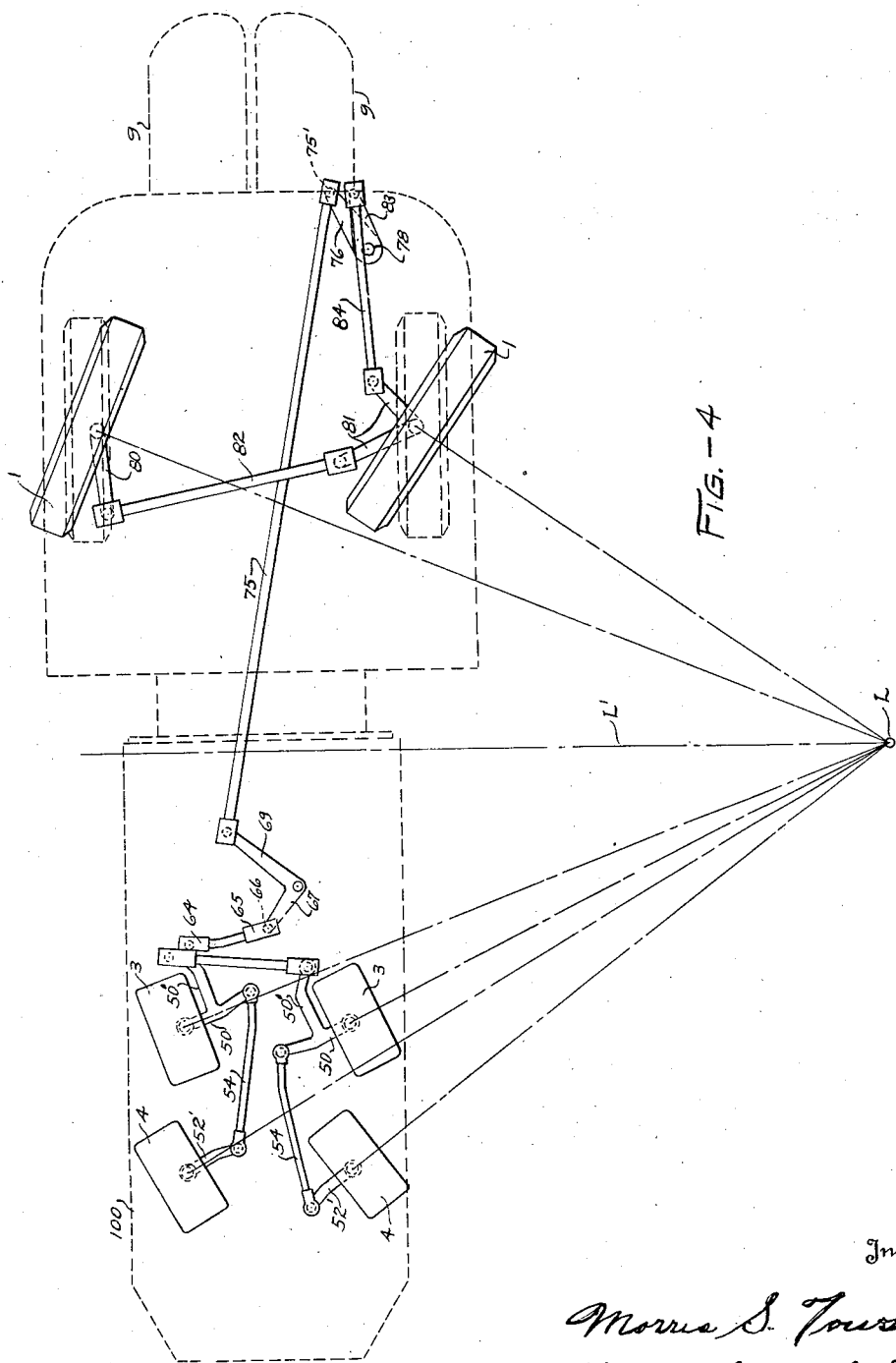

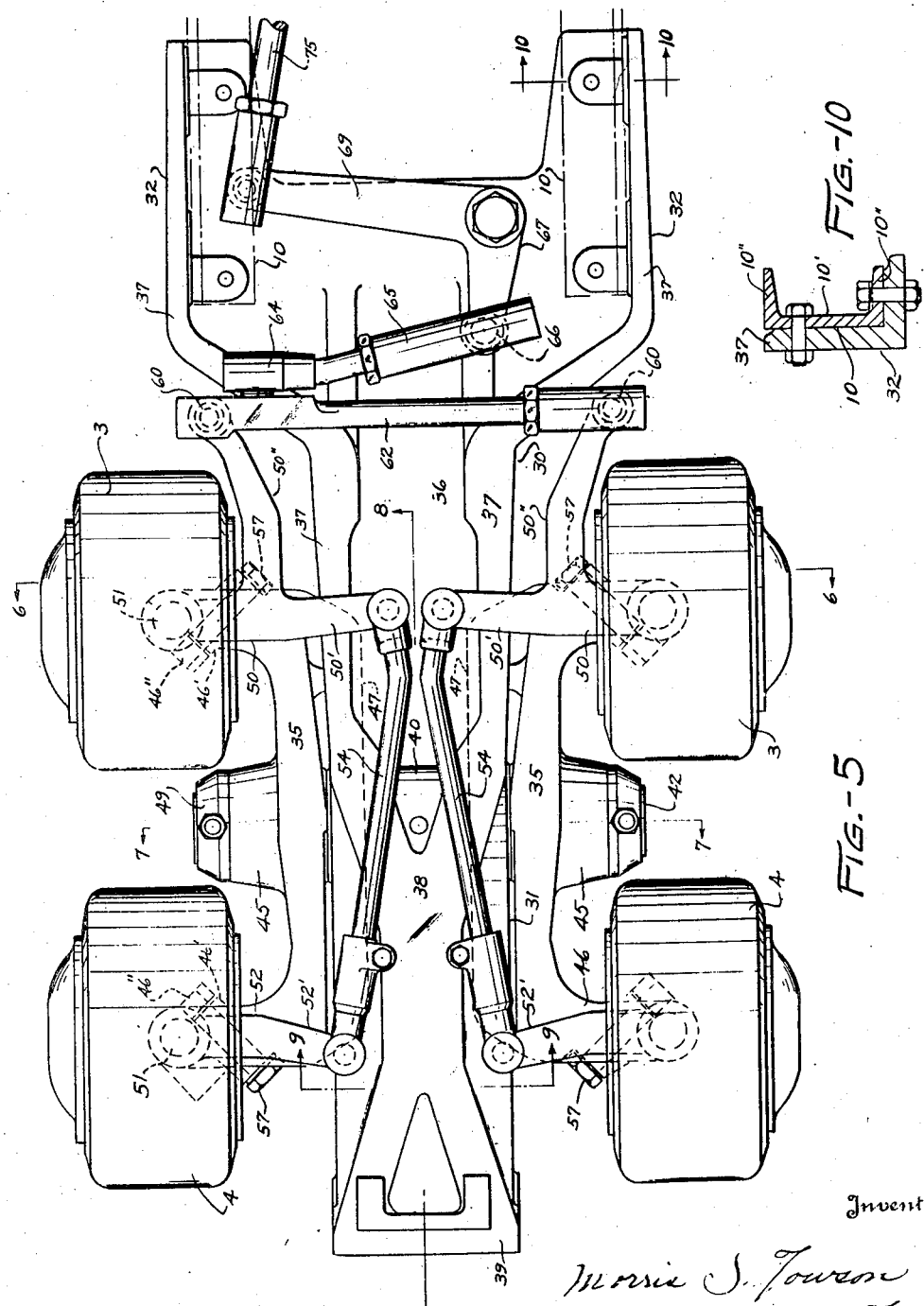

June 7, 1932. M. S. TOWSON 1,862,287
INDUSTRIAL TRUCK
Filed May 31, 1929 5 Sheets-Sheet 5

Inventor
Morris S. Towson
By Bates, Golrick & Jeare
Attorney

Patented June 7, 1932

1,862,287

UNITED STATES PATENT OFFICE

MORRIS S. TOWSON, OF SHAKER HEIGHTS, OHIO, ASSIGNOR TO ELWELL-PARKER ELECTRIC COMPANY, OF CLEVELAND, OHIO, A CORPORATION OF OHIO

INDUSTRIAL TRUCK

Application filed May 31, 1929. Serial No. 367,205.

A recent development in load mechanism, particularly for handling heavy loads of material in factory buildings, is an electrically driven industrial truck of the lift platform type, capable of raising a load from low height, wherein there are a plurality of pairs of longitudinally spaced relatively small load supporting wheels disposed beneath and supporting substantially the entire weight of the load on the platform. This development was occasioned partly by increased load handling capacity requirements and partly by supporting surface conditions in and about such factory buildings, which conditions are of course far from ideal. Until this development, most industrial trucks, particularly of the low lift platform type, had two large driving wheels and only two small platform-load carrying wheels.

An apparently obvious way of solving the difficulties, due to increased load carrying requirements and practically inevitable defective surface conditions, would seem to be to retain the four wheel arrangement and provide better wheel tread members, but notwithstanding very extensive research on part of rubber tire manufacturers, the difficulties have not yet been and probably will not be solved in this manner.

It is practically essential that the wheels beneath the load lifting device, such as a platform adapted to raise a load from a position close to the ground be of small diameter, so as to lie beneath the platform when in its lowered position; also they should be dirigible, that is, capable of being turned on substantially vertical axes for steering the truck, to meet both these conditions, there is obviously a limit to the permissible length of line contact between each wheel and the supporting surface, since if the wheel is too wide, the increased length of line contact renders steering too difficult and also increases the skidding effect, and consequent tread wear, whenever the wheels are turned for steering.

Due to the above and other difficulties, the trend of development in industrial trucks of the lift platform type is toward the provision of a plurality of pairs of longitudinally spaced small load supporting wheels for the load lifting platform, irrespective of truck size and capacity; that is to say, the tendency is to increase the number of wheels on trucks from three to five tons capacity, as well as on those designed to handle and haul loads up to say twenty tons.

One of the problems presented in providing such plurality of pairs of small load supporting wheels has to do with providing steering mechanism, such as linked steering knuckles for the wheels which will be compact yet have adequate clearance to permit the free rocking movement of the wheels without interfering with steering.

Still another problem is to minimize the height of the small load carrying wheel mounting while maintaining adequate strength, and this also includes and is influenced by the provision of steering linkage arrangements with adequate clearance.

Still another problem is presented by the fact that unevenness in the supporting surface may affect only the wheels on one side of the truck, and not both wheels of a given pair at the same time. This problem translates itself into the difficulty of maintaining all the small load supporting wheels on the ground at all times. For example, if at any time, two of the small wheels of a four-rocking-wheel assembly are raised off the ground, substantially all the load is shifted to the two remaining wheels, and this not only imposes severe strain on the tread portions of the wheels remaining in contact, but also imposes severe lateral strains on the whole truck frame. The frame strains are usually twisting strains, where, for example, the platform and under frame structure tends to get out of normal relation to the traction drive unit portion of the truck and its practically rigid frame work.

The general object of my invention is to provide an industrial truck capable of being made in various sizes to accommodate loads, say from three tons to fifteen or twenty tons, and wherein the various structural and operating problems, such as above set forth, are solved.

An object is to provide an industrial truck adapted for lifting a load from a position close to the ground and transporting the load, which truck may be driven over uneven surfaces without imposing excessive lateral or twisting strains on the general truck chassis and associated parts, and without excessive wear on the wheel tread surfaces.

The provision of a generally satisfactory arrangement of truck having a plurality of pairs of longitudinally spaced low-platform load carrying dirigible wheels has not been attained, as a matter of practice, because with the arrangements now used, the overall height is too great to allow the load to be picked up from a position as close to the ground as is desirable. A further object of the invention, therefore, is to provide a more vertically compact load carrying wheel mounting or under-carriage construction for industrial trucks of the lift platform type.

A more specific object, on the order of the one just stated, is to provide an industrial truck frame extension and dirigible load carrying wheel mounting thereon, wherein is combined unusual supporting strength and operating flexibility with minimum height, whereby the truck will be enabled to handle and transport capacity loads, arranged to be picked up from an exceedingly low level.

A further object is to provide a load supporting frame extension and multiple dirigible wheel support, including adequate and compact steering connections therefor, which will constitute a complete sub-assembly capable of attachment to an industrial truck power traction unit of known and used construction, whereby such units will not have to be modified in adapting them for greater capacity and better operation under existing conditions.

A still further object is to provide an under-carriage construction, including dirigible wheels for an industrial truck lift platform mechanism which will permit limited individual rocking movement of the wheels at each side of the carriage, and which shall be so arranged that the steering connections will be entirely free in operation to accomplish steering and yet occupy minimum vertical space.

Further objects and features of the invention will become apparent from the following description relating to the accompanying drawings. The essential novel characteristics are summarized in the claims.

Figure 7:
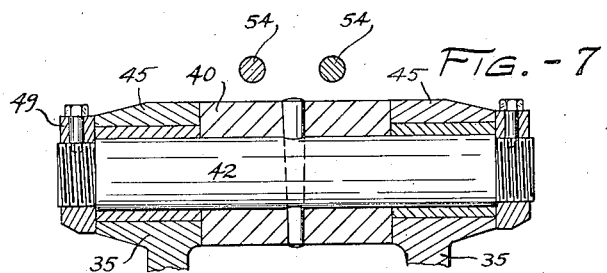
Figure 8:
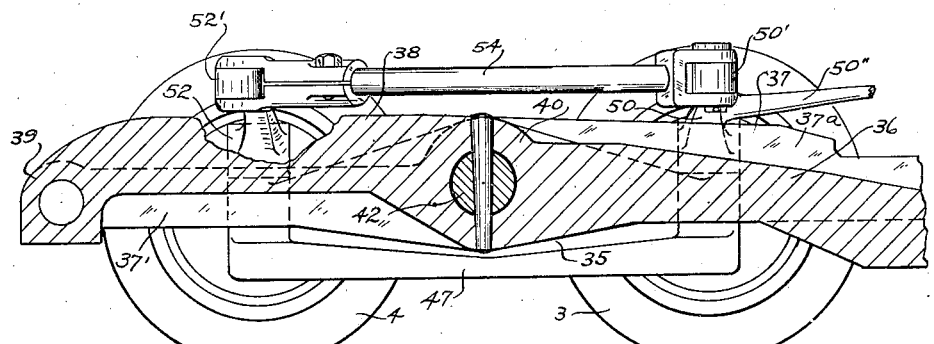
Figure 9:
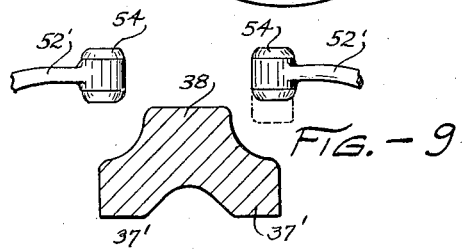

In the drawings, Fig. 1 is a side elevation of an industrial truck embodying my invention; Fig. 2 is a plan view of the truck; Fig. 3 is a diagram illustrating the steering capabilities of a truck designed in accordance with my invention; Fig. 4 is a plan view of the preferred steering linkage arrangement by which all of the wheels on the truck are connected for simultaneous turning with their axes always directed to a common locus lying in a fixed locus line; Fig. 5 is a plan view of the under-carriage construction for supporting the changeable load, as on a platform; Figs. 6 and 7 are transverse cross sectional views, as indicated by the corresponding cross sectional lines in Fig. 5; Fig. 8 is a longitudinal fragmentary cross sectional view of the under-carriage, as indicated by the line 8—8 on Fig. 5; Fig. 9 is a detail fragmentary cross sectional view taken along the line 9—9 on Fig. 5; Fig. 10 is still another fragmentary transverse cross sectional view taken along the line 10—10 on Fig. 5, and Fig. 11 is a detailed fragmentary side elevation of the platform lift under-carriage and wheels, showing certain operating capabilities of a mechanism constructed according to my invention.

Referring again to the drawings, wherein the preferred arrangement of truck designed for carrying a load, of from ten to fifteen tons is illustrated, there is a main chassis or frame 1 having mounted thereon, at its forward end, a pair of driving wheels 2, and adjacent its rear end two pairs of relatively small load carrying wheels 3 and 4. All the wheels, as shown, are dirigibly arranged so as to turn about individual vertical axes, the arrangements permitting which will be later described.

Extending upwardly from the forward end of the chassis is a frame structure, designated generally 5, which constitutes a support for a battery and certain of the controls, the battery being disposed in a general housing or casing 6. Disposed beneath the battery housing and frame structure is a motor 7 which has suitable driving connections, including reduction gearing, differential mechanism, etc. (not shown) to the driving wheels 2. At the extreme forward end of the truck are various operator's controls, including a steering wheel 8 which the operator may reach from his position on pivoted platform members 9, extending forwardly from the truck and which also comprise part of the truck control.

Rigid with the general frame 1 and extending rearwardly therefrom are a pair of sill members 10 which, as shown, comprise channel sections having comparatively deep web portions 10' and inwardly extending horizontal flanges 10" (see Fig. 10 particularly).

The under-carriage of the platform or load lifting mechanism comprises, as shown in the drawings, a comparatively heavy flanged centrally disposed frame extension member enlarged horizontally at the end adjacent the truck housing for attachment to the frame bars or sills 10, or equivalent frame structure. The extension member is made with minimum depth consistent with rigidity and strength, and at the end remote from the main truck housing it is made comparatively narrow in order that the dirigible wheels supported by the member may lie comparatively close to the truck center and not extend beyond the platform edges. The extension member is preferably formed as a casting and is generally designated 30. Disposed on opposite sides of the narrow portion 31 are rocking frame arms or supports 35 for the dirigible wheels 3 and 4.

In the preferred construction, there is a central horizontal web 36 extending from the enlarged end 32 to about the midpoint of the narrow portion 31. At the sides of the extension casting are vertical flange 37 to which the webs of the channels forming the frame bars 10 are attached as by suitable bolts or rivets (see Fig. 10). The lower horizontal flanges 10'' of the frame bars are similarly secured to the web 36. The flanges 37 continue along the sides of the narrow portion of the extension and finally join each other as at 38 near the rear end to form a central vertical flange-like brace, (see Fig. 9). Near the very end of the casting, the side flange formations again appear and the extreme end is formed and adequately braced to provide a suitable support for the rear end of a suitable platform, to be later described.

About midway between the ends of the narrow portion of the member 30, the member is strengthened by a hub-like formation 40 connecting the flanges and web, and the arms or rocking supports 35 for the dirigible wheels are slung on a heavy bar 42 passing transversely through the formation 40 and extending outwardly at both sides of the casting (see Fig. 7).

The preferred construction of the arms or rocking supports 35 is, as shown in Figs. 5, 6 and 8. Here it will be seen that the rocking supports have intermediate hub formations at 45, preferably freely turnable on the bar 42, to allow individual rocking movement of the wheels, supported on the respective arms, about the axis of the bar. The arms, at their ends, have wheel supporting outwardly extending portions 46 to which the wheels are attached, as will be presently shown. The transverse cross section of the arms is comparatively thin for lateral compactness and wheel clearance, but deep for vertical strength, and below the narrow portion of the frame extension 30, I provide stiffening flanges for the arms extending substantially throughout their length, as indicated at 47 (see Fig. 8).

The flanges 47 serve not only to strengthen the arms, but also to provide vertical stops or limiting members for the rocking movement of the arms. As shown, there is enough clearance between the underside of the frame extension and the flanges 47 to allow a substantial rocking movement of the arms, but not enough to allow the wheels to engage the platform when the latter is in its lowered position. The arms 35 may be prevented from outward movement along the bar 42 by suitable collars 49, secured as by means of set screws to the ends of the bar. These are shown as beveled to just clear the wheels 2 and 3 when the latter are turned for steering.

The arms are preferably disposed substantially in the horizontal plane of the central narrow portion of the frame extension, so as to materially decrease the height of the entire structure, and so as to carry the wheels with their axes intersecting the body of the frame extension substantially centrally thereof.

The support for the dirigible wheels 3 and 4 on the arm extensions 46 of the arms 35 comprises steering knuckle members 50 and 52 bifurcated to respectively embrace the ends 46 of the arms and secured thereto by suitable vertical pins 51. Each steering knuckle is provided with an inwardly extending arm 50' and 52' respectively which pass over the top side of the narrow portion of the frame extension 30 with adequate clearance to allow the arms and suitable tie bars therefor, shown as links 54, to move up and down with the rocking wheel support, but free from the frame extension and platform at all times. The limiting flange arrangement 47 on one side of the frame extension, and the steering arms 50' and 52' on the opposite side, make a very compact assembly with practically no waste space but adequate clearance.

The ends 46 of the arms 35 are preferably provided with clamping devices for the pins 51, the clamping devices, as shown, comprising diagonally extending boss formations 46' and 46'', the boss formation 46'' being separated from the formation 46' so that a clamping bolt 57 passing through both formations will draw the two clamping elements thus formed in tight engagement with the respective pins to hold them against vertical displacement.

The steering connections comprise, in addition to the steering arms 50' and 52', additional arms 50'' on the foremost steering knuckles 50 which, as shown, lie between the foremost wheels 3 and the narrow portion of the frame extension 30. The free ends of the arms 50'' are connected preferably by means of ball joints 60 to a cross link 62 extending over the top side of the extension member 30, and this link 62 is connected as by means of a ball joint 64 to a link 65, shown as composed of separate parts for longitudinal adjustment. The link 65 is preferably connected as by another ball joint 66 to the rearwardly extending arm of a bell crank 67 supported on a vertical pivot bolt or pin rising from the web 36 of the enlarged forward end of the frame extension member 30. The bell crank has a laterally extending arm 69, the swinging of which, through the linkage described, turns the wheels 3 and 4 about their respective vertical axes of the pivot pins 51 simultaneously to steer the truck.

It will be noted that the arrangement is so designed that the wheels may swing an adequate amount for turning a short corner, notwithstanding the fact that the wheels are in the same plane with the hub formations on the arms, with the arms themselves, and with the frame extension member 30.

The steering knuckle adjustment arrangement above described is of course controlled by the operator. The connections to the steering wheel 8 may include a link or bar 75 which extends forwardly from the arm 69 of the bell crank 67 and which is attached at its forward end as by means of a suitable joint 75' to an arm 76. The arm 76 is on a vertical shaft 78 which has suitable reduction gearing connections to the steering wheel 8 (see Fig. 2). The gearing is not illustrated. In order that turning of the shaft 78 may position the large driving wheels 1 for steering simultaneously with positioning the small load carrying wheels 2 and 3, there are provided steering knuckle arrangements, including armed members 80 and 81 for the large wheels, connected by a cross link 82, so that turning movement of one of the arm members also turns the other. The armed member 81 is connected as by a link 84 to an arm 83 which is, in effect, rigid with the arm 76. The arrangement of arms and links throughout the whole steering mechanism is such that the axis of each wheel intersects the axle of all the other wheels at a common turning locus, such as L, which, depending on the length of the turning radius, moves along a turning loci indicating line L', extending transversely of the truck intermediate its ends.

The arrangement of the steering connections on the platform under-carriage and the body and flange arrangement on the frame extension casting 30 bear a relationship to each other such that low height is maintained, without decreasing the strength, impairing the operating capabilities or adding unnecessary weight to the structure. In the multiple wheel arrangement and steering hookup shown, the steering knuckle arms 50' for the forward small wheel 3 are necessarily longer than the arms 52' for the wheels 4, since all the wheels are to turn about a common turning locus lying in a locus line intermediately of the relatively small wheels and the driving wheels as shown in Fig. 3. This carries the joint which connects the links or bars 54 to the arms 50' well toward the center of the casting 30. The joints between the links and the arms 52' lie more distant from this center. It is impractical to decrease the vertical dimensions of the joint much below the proportions shown and still provide adequate strength, hence I provide the necessary clearance by designing the casting 30 in such manner that the web or body is near the bottom portion of the casting and is provided with the vertical flange formations 37 at the top of this web or body and at its side edges. This results in a depression 37a (Figs. 6 and 8) in which the arms 50' and their correlated knuckles may swing. This is apparent from Fig. 6. Now, to accomodate the arms 52' and their respective link joints, I reverse the arrangement in the region of swing of the arms 52'; that is to say, the essential web formation which tapers off as shown in Fig. 9 for full clearance, is at the top of the casting and the side vertical flange formations 37' are at the bottom of the casting. Thus a practically ideal cross section from the standpoint of strength and stability is maintained throughout the entire length of the casting 30, notwithstanding the unique clearance problem presented by the knuckle arms and lengths, which must not only have adequate swinging clearance horizontally (See Fig. 8) but also vertical swinging clearance, due to the fact that the knuckle arms and lengths move vertically with the rock wheel supports 35.

The platform, indicated at 100, may be considerably modified. As shown, it comprises a substantially rectangular member, flanged downwardly at all edges for strength and having a plane central supporting surface 101 entirely overlying the whole under-carriage structure. The platform has at its forward edge, a stiffening member 103, shown as an angle section. On its underside and near its ends, the platform has downwardly extending brackets 104 and 105. The brackets 105 are connected by a pair of spaced links 106 pivoted at their opposite ends to the brackets 105 and the rear end of the frame extension 30. At the forward end of the platform are spaced links 107 having suitable pivotal connections to the bracket members 104 as well as to rearwardly extending brackets 108 secured to the rear side of the housing supporting frame work 1, and preferably also to the sill members 10.

A suitable power mechanism for swinging the platform to raise and lower the same with a load thereon may comprise a trunnioned power device, including a ram bar 110 pivoted to suitable ears 111 on the stiffening member 103 of the platform, there being a motor 114 and gearing, suitably arranged to move the ram bar inwardly toward the housing, to raise the platform, and outwardly toward the rear of the truck to lower it. The mechanism shown for raising and lowering the platform is, to a large extent exemplary, it being understood that the platform may be of the tier lift type, arranged to lie closely adjacent the under-carriage and frame extension in its lowered position to pick up a load from low level, but which, by reason of suitable elevator mechanism may raise the load to a considerably higher elevation than may be done by means of a swinging platform or load engaging support, such as illustrated.

In Fig. 11 I have illustrated the manner in which the rocking supports for the two pairs of wheels 3 and 4 permit all the wheels to remain on the supporting surface under ordinary surface conditions to be found in the usual industrial plants and premises. In Fig. 11, the more remote wheels 3 and 4, as shown, make ground contact in the same plane which is substantially horizontal, see ground line G. The near wheel 3, however, is shown as raised above the far wheel 3 and the near wheel 4 dropped below the far wheel 4. It will be seen that all wheels are in contact with the supporting surfaces G, G' and G², notwithstanding their relative unevenness. If the rocking supports were such that when one wheel of each pair is raised, for example, when these wheels are diagonally opposite, the remaining wheels are also raised, as with the rigid cross rocking frames previously used, a surface condition, such as illustrated, would raise two of the wheels off the supporting surface with attendant deleterious effects on the truck and wheels previously set forth.

From the above description, it will be seen that I have provided an industrial truck under-carriage support for a low lying lift platform, wherein there is a multiple arrangement of small load supporting wheels, which truck will be adequately arranged for supporting capacity loads, irrespective of the load class of the truck, and which will minimize lateral displacement of the load supporting end of the truck with relation to the main body or power unit portion and consequent strain on the frame structure when the truck is driven over uneven surfaces.

It will be further seen that I have provided an under-carriage mechanism for an industrial truck having a load supporting arrangement capable of carrying the load at low height, which mechanism forms a complete sub-assembly with obvious manufacturing advantages. It will be further seen that the under-carriage mechanism is adapted for use with any sort of platform arrangement, whether a lift platform or stationary platform.

With regard to the steering arrangement, it will be seen that this cooperates with the supporting frame structure in securing minimum overall height, and that the steering mechanism will operate freely and effectively irrespective of uneven road surfaces over which the truck may be driven.

It will be further seen that the under-carriage arrangement may be modified, using the four individually rocking wheel assembly as a unit to provide additional wheel supports for a low lying load carrier of an industrial truck. An important advantage apparent from the above, is that, assuming average road surfaces, there is practically no chance of load on the platform being carried on only part of the complete set of wheels; wherefore, I may decrease line contact of the wheels, making them shorter and of the desirable small diameter.

It will be understood that each portion of the truck arrangement shown and described may be modified with reference to the other portions without departing from the intended scope of the invention.

I claim:

1. In a multiple dirigible wheel mounting for an industrial truck, load carrying mechanism adapted to carry a load at low elevation, the combination of a plurality of pairs of relatively small dirigible wheels, steering knuckles and steering arms therefor, said arms extending inwardly from the wheels toward the truck center, certain of the arms being longer than others to permit all the wheels to swing about a common turning center for steering, a central frame member over which all the arms extend, individual links connecting the arms and lying on respective sides of the member, rocking means pivotally connected to the member, and supporting connections therefrom to the wheels, said member having a web and upwardly directed edge flanges at the portion thereof underlying the longer steering arm, and a web and downwardly directed flanges at the portion thereof underlying the shorter arm, whereby a general flange cross section may be preserved substantially throughout the length of the member while preserving the necessary and length clearance for steering.

2. In a truck of the character described, a chassis, two pairs of individually steerable wheels mounted on rocker members longitudinally disposed relative to said chassis structure, means transversely pivoting said rocker members to the truck chassis, a steering knuckle for each wheel, said knuckles having steering arms extending inwardly over the rocking arms and the truck chassis, a pair of links, each link connecting the steering arms on respective sides of the chassis, two of said steering arms having additional arms, and means connecting said additional arms and overlying the chassis and arranged to simultaneously turn all of the wheels for steering the truck.

In testimony whereof, I hereunto affix my signature.

MORRIS S. TOWSON.